(12) United States Patent
Andersson et al.

(10) Patent No.: US 7,481,059 B2
(45) Date of Patent: Jan. 27, 2009

(54) METHOD AND APPARATUS FOR PROVIDING AN AFTERBURNER FUEL-FEED ARRANGEMENT

(75) Inventors: Stefan Andersson, Grastorp (SE);
Patrik Bäckander, Trollhättan (SE);
Hans Falk, Trollhättan (SE); Klas Lindblad, Trollhättan (SE); Hakan Schmidt, Trollhättan (SE)

(73) Assignee: Volvo Aero Corporation, Trollhattan (SE)

( * ) Notice: Subject to any disclaimer, the term of this patent is extended or adjusted under 35 U.S.C. 154(b) by 436 days.

(21) Appl. No.: 10/905,205

(22) Filed: Dec. 21, 2004

(65) Prior Publication Data
US 2006/0032231 A1 Feb. 16, 2006

Related U.S. Application Data

(60) Provisional application No. 60/522,205, filed on Aug. 31, 2004, provisional application No. 60/601,011, filed on Aug. 12, 2004.

(51) Int. Cl.
*F02K 3/10* (2006.01)

(52) U.S. Cl. .......................... 60/761; 60/766

(58) Field of Classification Search .............. 60/761, 60/766, 765; 138/108, 112, 113
See application file for complete search history.

(56) References Cited

U.S. PATENT DOCUMENTS

| | | | | |
|---|---|---|---|---|
| 3,526,934 A | * | 9/1970 | Owen, Sr. ............... 285/154.1 |
| 3,698,186 A | * | 10/1972 | Beane et al. ................ 60/746 |
| 3,797,529 A | * | 3/1974 | Gebelius ...................... 138/111 |
| 3,800,530 A | * | 4/1974 | Nash ........................... 60/761 |
| 4,901,527 A | * | 2/1990 | Nash et al. .................... 60/765 |
| 5,018,260 A | * | 5/1991 | Ziu ............................. 24/555 |
| 5,297,391 A | * | 3/1994 | Roche ......................... 60/740 |
| 5,396,761 A | * | 3/1995 | Woltmann et al. ........ 60/39.827 |
| 5,400,589 A | * | 3/1995 | Mahias et al. ................ 60/762 |
| 5,813,221 A | * | 9/1998 | Geiser et al. ................. 60/762 |
| 6,112,516 A | * | 9/2000 | Beule et al. .................. 60/765 |
| 6,125,627 A | * | 10/2000 | Rice et al. .................... 60/765 |
| 6,463,739 B1 | * | 10/2002 | Mueller et al. ............... 60/765 |
| 6,595,473 B2 | * | 7/2003 | Aoki et al. .................. 248/74.4 |
| 6,668,541 B2 | * | 12/2003 | Rice et al. .................... 60/207 |
| 6,736,338 B2 | * | 5/2004 | Johnson et al. ............. 239/548 |
| 6,983,601 B2 | * | 1/2006 | Koshoffer .................... 60/761 |
| 7,007,720 B1 | * | 3/2006 | Chase et al. ................. 138/110 |
| 7,119,275 B2 | * | 10/2006 | Suzuki et al. ................ 174/503 |
| 2006/0213180 A1 | * | 9/2006 | Koshoffer .................. 60/226.1 |

\* cited by examiner

*Primary Examiner*—William H Rodríguez
(74) *Attorney, Agent, or Firm*—Novak Druce + Quigg, LLP

(57) ABSTRACT

An afterburner fuel-feed arrangement including an elongate fuel spraybar for distributing fuel to the afterburner section of a turbo-combustion engine. The spraybar includes a fuel-receiving spray head in fluid communication with a plurality of elongate fuel pipes, which are surrounded by an elongate, aerodynamic-shaped shroud. The surrounded fuel pipes project into an interior through-core of the engine. The shroud has an interior lateral sidewall that includes a pipe-receiving portion configured to abuttingly engage a corresponding shroud-engaging portion of an exterior surface of one of the fuel pipes. The pipe-receiving portion is configured to substantially radially fix a fuel pipe received therein relative to the shroud, thus supporting and bracing the pipe and raising the eigenfrequencies of the assembly into ranges higher than those of the incorporating engine.

15 Claims, 11 Drawing Sheets

METHOD AND APPARATUS FOR PROVIDING AN AFTERBURNER FUEL-FEED ARRANGEMENT

CROSS-REFERENCE TO RELATED APPLICATIONS

The present application claims the benefit of U.S. Provisional Application Nos. 60/601,011 filed 12 Aug. 2004 and 60/522,205 filed 31 Aug. 2004. Said applications are incorporated herein by reference in their entireties.

FIELD OF THE INVENTION

The present invention relates generally to afterburners for jet engines; and more particularly, the invention relates to afterburner fuel-feed arrangements for such engines which may be exemplarily employed on aircraft.

BACKGROUND OF THE INVENTION

Afterburner spraybars for jet engines are well appreciated assemblies by those persons skilled in the relevant art. An example of such spraybars is found in International Publication Number WO 2004/033966 A1 which designates the United States, and in the corresponding United States Provisional Patent Application having Application No. 60/319,601; each of which are hereby expressly incorporated by reference for purposes of disclosure.

In general, afterburner fuel spray arrangements are utilized to boost the thrust of jet engines during limited high-demand periods. Relevant to aircraft engines, such times can include, for instance, take off from the flight deck of an aircraft carrier.

The afterburner spraybars are located in the core gas flow of the jet engine, and are therefore subjected to extremely high temperatures, which can also be quite variable. This can present challenges, especially to configurations such as that shown in WO 2004/033966 A1 in which fuel pipes are directly exposed to the hot core gases behind the turbine section of the engine. Another problem with such fuel-pipe-exposed configurations is that the unsupported, relatively long length of the fuel pipes can make the assembly susceptible to eigenfrequencies (natural or harmonic frequencies) falling within engine range frequencies which is also viewed as detrimental.

For these reasons, it is generally known to provide protective heat shield structures for such afterburner fuel pipes, and even to distribute cooling bypass air thereto. One particular example is found in U.S. Pat. No. 5,297,391 wherein a fuel distributing pipe 52 is preceded (with respect to core gas flow) by a shielding tubular enclosure 54. Through the illustrations of FIGS. 4-6 of the '391 patent, however, it is clear that the overall length of the fuel pipe 52 remains substantially unbraced with regard to the enclosure 54. In fact, as depicted in FIG. 5 of the '391 patent, it is clear that a slit 70 must be maintained therebetween in order for cooling air to pass therethrough. Even though it could be said that it appears from FIG. 6 that a distal or bottom end of the fuel pipe could be anchored in a wall end 66 of the enclosure 54, it is not represented that the predominantly unsupported length of the fuel pipe 52 is braced against assuming harmonic oscillation, with the engine. This detrimental performance can obviously cause extreme vibration of the fuel pipe 52 and/or enclosure 54 resulting in unacceptable vibrations of, and friction and wear between, the several constituent components. Still further, each fuel pipe is individually enclosed, and no fuel pipes are arranged adjacent or abreast to one another in a crosswise orientation to the engine's core gas flow as defined by the present invention, and as will be described in greater detail hereinbelow. These individual assemblies disclosed in the '391 patent are not only costly, but their required frequency of radial distribution within the core gas flow can compromise the throughput of the engine.

For these reasons, as well as others that will become evident to those persons skilled in the art from the descriptive disclosure provided herein, the present invention has been developed to address these problems and provide additional benefits to users.

SUMMARY OF THE INVENTION

As disclosed herein, the present invention is described with respect to three primary embodiments: (1) the afterburner fuel-feed arrangement alone; (2) the arrangement installed in a turbo-combustion engine; and (3) the arrangement installed in a turbo-combustion engine and mounted on an aircraft. In that the commonality between these several embodiments is the spraybar of the afterburner fuel-feed arrangement, and the other components of the developed embodiments are generally known, at least as utilized in the present disclosure, the invention is summarized on the basis of the spraybar.

Therefore, in one embodiment, the present invention takes the form of an afterburner fuel-feed arrangement comprising (including, but not necessarily limited to) an elongate fuel spraybar for distributing fuel to the afterburner section of a turbo-combustion engine. The spraybar has a longitudinal axis and includes a fuel-receiving spray head in fluid communication with a plurality of elongate fuel pipes surrounded by an elongate, aerodynamic-shaped shroud. The spray head is configured to be mounted in a casing of a turbo-combustion engine (which is contemplated to include both turbo-jet and turbo-fan engine configurations) and thereby project the surrounded fuel pipes into an interior through-core of the engine in cross-wise orientation to a core gas flow therein to establish an installed configuration of the spraybar.

In this embodiment, the shroud has an interior lateral sidewall that includes a pipe-receiving portion. The pipe-receiving portion is configured to abuttingly engage a corresponding shroud-engaging portion of an exterior surface of one of the plurality of elongate fuel pipes. The pipe-receiving portion is configured to substantially maintain the position of a fuel pipe, received therein, relative to the shroud. In this manner, the fuel pipes are supported along their length, and when the pipes are abuttingly engaged with the shroud, the thereby braced configuration is stiffened which raises the eigenfrequencies of the assembly (arrangement) into ranges higher than those of the incorporating engine. Each such feature serves and functions to minimize vibration, reduce wear, and increase operational life of the elongate fuel spraybar assembly.

In a further development (variation), the shroud has an elliptically tubular cross-sectional shape, taken perpendicularly to the longitudinal axis of the spraybar, along a predominance of a length of the shroud. Furthermore, the elliptical cross-sectional shape defines a long and short cross-axis of the shroud, the long cross-axis of the shroud being substantially aligned, in a preferred installed configuration, with a direction of core gas flow of the engine.

In an optional development, at least two of the several elongate fuel pipes are arranged adjacent and substantially parallel to one another, and with a longitudinal axis of each perpendicularly intersecting the short cross-axis of the shroud. As may be best appreciated in FIG. 9, this orientation places the fuel pipes (in the illustrated case, a pair of fuel pipes) abreast of one another, and oriented long-wise (the combined width of the adjacent pipes, plus two thickness of the shroud) across the core gas flow. Heretofore, such orientations have been avoided in order present as little resistance to the core flow as possible by the fuel pipes. The unique configuration of the present adjacent fuel pipes, however, within the aerodynamic, elliptically shaped shroud, facilitates such an advantageous orientation. Still further, such a configuration reduces the total number of spraybar assemblies (compared to previously known configurations) necessary to adequately feed an engine's afterburner.

In a complementary development, the shroud and all of the elongate fuel pipes have a longitudinal axis oriented substantially parallel to the longitudinal axis of spraybar.

As a further optional complement, the two elongate fuel pipes are adjacently and abuttingly arranged one to the other, and the so paired fuel pipes are in abutting contact with opposite interior lateral sidewalls of the shroud. In this manner, the elongate fuel pipes constitute a brace in the shroud against bending moments about the long cross-axes of the shroud.

As intimated above, another beneficial feature of the present invention is that accordingly configured spraybars have eigenfrequencies greater than eigenfrequencies of receiving engines thereof.

In a further development, the shroud further includes multiple (a plurality of) pipe-receiving portions, each of which includes an elongate recessed portion (i.e., a groove) flanked on each of two lateral sides thereof by an elongate raised-ridge portion. It is this configuration that presents the "wave" or fluted interior surface of the shroud.

In one example, a tight friction-fit exists between each of the plurality of pipe-receiving portions and a respective fuel pipe received therein when the spraybar is in an inactive state without fuel being fed through the fuel pipes (see FIG. 9). A comparatively reduced friction-fit exists therebetween when the spraybar is in an active state with fuel being fed through the fuel pipes (see FIG. 10).

It is preferred that each of the fuel pipes be tubular, and more preferably cylindrical in shape (having a circular cross-section) and that each respective pipe-receiving portion of the shroud be concavely configured (e.g., as a groove) and sized to establish an abutting conformance fit with a respective fuel pipe received therein when in the inactive state. In this manner, relative motion (or resistance thereto) between the fuel pipes and shroud provides mechanical damping to the spraybar and thereby decreases stress caused by vibrations.

Conversely, but in a complementary manner, in the active state in which the fuel pipes are being cooled (but the shroud is obviously still being heated by the core gas flow), a spaced-apart, but trapped configuration is established for the cylindrical fuel pipes received within the recessed portion (bounded by the raised-ridge portions) of the pipe receiving configuration at the interior lateral wall of the shroud. It should be appreciated that in this configuration a gap space can at least intermittently exist between the fuel pipes and shroud. Benefits that are derived therefrom are that the transfer of heat (given the buffering air gap) between the pipes and shroud is drastically reduced, and that the thermal stress of the shroud is also reduced.

Because of the fluted configuration presented by the pipe receiving portion(s) on the interior lateral sidewall(s) of the shroud, these receiving portions, and particularly the raised-ridge portions, brace against bending moments about long cross-axes of the shroud.

As may be best appreciated in FIGS. 6 and 8, an expanding transition portion is interposed between the spray head and the shroud. An interior wall of the expanding transition portion is provided with a plurality of recesses therein, each of such recesses being aligned with an elongate recessed portion of a respective pipe-receiving portion of the interconnected shroud.

In still a further development of the invention, the long cross-axis of the shroud (see FIG. 9) is substantially aligned, in the installed configuration, with a longitudinal axis of the engine. In this orientation, the shroud acts as a directing vane for the core gas flow of the engine. In a preferred embodiment, the direction imparted to the gas flow is aligned with the longitudinal axis of the engine thereby easing throughput.

In yet a further development, a cooling air inlet opening is provided in the spraybar for receiving relatively cool engine bypass air into an interior space of the shroud at a location proximate a head-end of the spraybar. At a distal end of the spraybar, a cooling air outlet opening is provided for exhausting cooling air therefrom. As may be best appreciated from FIG. 5, the cooling air outlet is of an elongated elliptical shape, dictated at least in partial dependence upon the elliptical shape of the shroud, which is effectively cut at an angle to a longitudinal axis thereof to provide such an outlet opening. In a complementary manner, it can be said that the cooling air outlet has an opening area greater than an interior cross-sectional area within the shroud taken perpendicular to the longitudinal axis of the spraybar at a lengthwise location of the spraybar proximate the cooling air outlet (compare FIGS. 5 and 10).

As may be further appreciated from FIG. 5, the configuration of the cooling air outlet can be described in terms of a plane that is coincident with the opening area of the cooling air outlet being transversely oriented to the longitudinal axis of the spraybar.

Due to the preferred orientation of the spraybar relative to the core gas flow as depicted at least in FIGS. 2 and 3, the cooling air outlet forms a negative air-scoop relative to the core gas flow in the engine through-core in the installed configuration. In this manner, an effectively negative pressure is instituted outside the cooling air outlet thereby tending to draw the cooling air from the shroud, and at a minimum does not present back pressure thereto.

Several beneficial features have been described hereinabove regarding the presently disclosed invention(s). It should be appreciated that these observations are not exhaustive, and further advantages and benefits will become obvious to those persons skilled in the art in view of the present disclosure. Still further, the embodiment and examples described herein should not be considered as limiting, but are provided to assist persons skilled in the art to implement the inventions, but the meets and bounds of which are delimited exclusively by the patented claims.

DETAILED DESCRIPTION

Exemplary embodiments of the present invention are depicted in the accompanying drawings; the primary and unique common component being the configuration and orientation of an elongate fuel spraybar 28 for a turbo-combustion engine 12, which is contemplated to take the form of either a turbo-jet or turbo-fan configuration.

Figure 1:
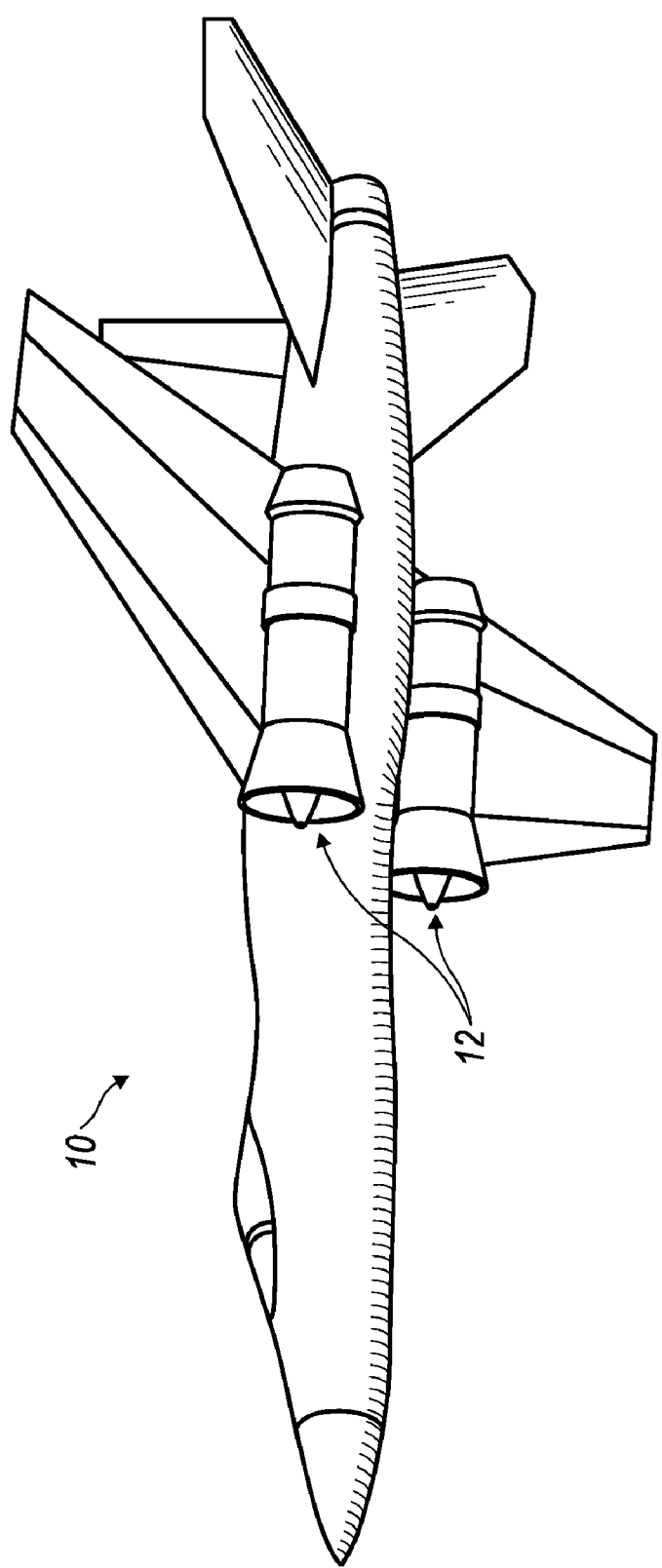
FIG. 1 is a perspective view showing an exemplary aircraft, with engines adapted according to the present invention, mounted thereto.

FIG. 1 illustrates an actual utilization embodiment of the invention wherein an aircraft 10 is shown with a pair of turbo-combustion engines 12 mounted thereupon.

Figure 2:
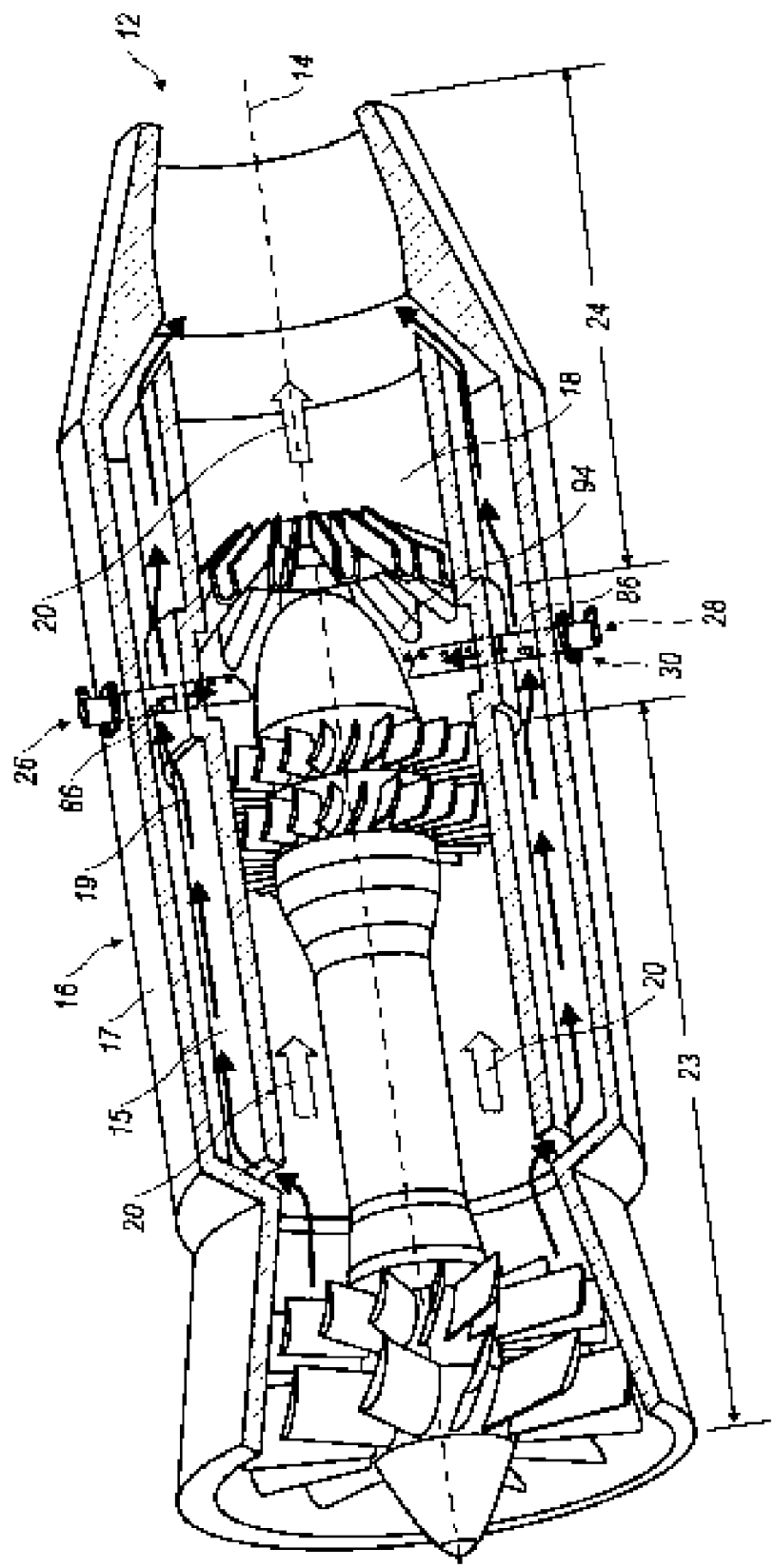
FIG. 2 is a perspective view, shown in partial cutaway, illustrating an installed configuration of a pair of elongate fuel spraybars on an engine and configured according to the teachings of the present invention.

FIG. 2 illustrates in detail, one of the engines 12 depicted as being mounted on the aircraft 10 in FIG. 1. In FIG. 2, the engine 12 is shown having a longitudinal axis 14 centrally located through a casing 16 of the engine 12. Defined within the casing 16 is an interior through-core 18 which is generally divided into a gas turbine section 23 preceding an afterburner section 24. Through the core 18, and the turbine and afterburner sections 23, 24, a core gas flow 20 passes.

An afterburner fuel-feed arrangement 26 is shown generally interposed between the turbine and afterburner sections 23, 24, and ahead of a flame holder 21 supported on flame holder struts 22. In FIG. 2, the spraybar 28 is shown in an installed configuration 30 with a longitudinal axis 32 thereof generally radially oriented with respect to the longitudinal axis 14 of the engine 12.

It may be further appreciated in FIG. 2 that the casing 16 defines a bypass air annulus 19 through which bypass air is directed during the engine's 12 operation. The bypass annulus 19 is exteriorly bounded by an outer sleeve 17 and interiorly bounded by an inner sleeve 15. Bypass air is diverted into the annulus 19 downstream of the intake fan of the engine 12. A cooling air inlet 86 of the afterburner fuel-feed arrangement 26 is located in the bypass annulus 19 with its opening directed forwardly into the oncoming bypass air 19. In this manner, bypass air is diverted through the afterburner fuel-feed arrangement 26 as described in greater detail hereinbelow. It should also be appreciated that a majority of the bypass air 19 flows past the spray head 34 of the afterburner fuel-feed arrangement 26 and is redirected back into the interior through-core 18 at the afterburner section 24 of the engine 12. An exemplary course of bypass air 19 that is diverted through the spraybar 28 is shown in FIG. 3 utilizing a solid outlined arrow in the casing annulus, and then with a dashed-line outlined arrow in the afterburner fuel-feed arrangement 26.

Figure 3:
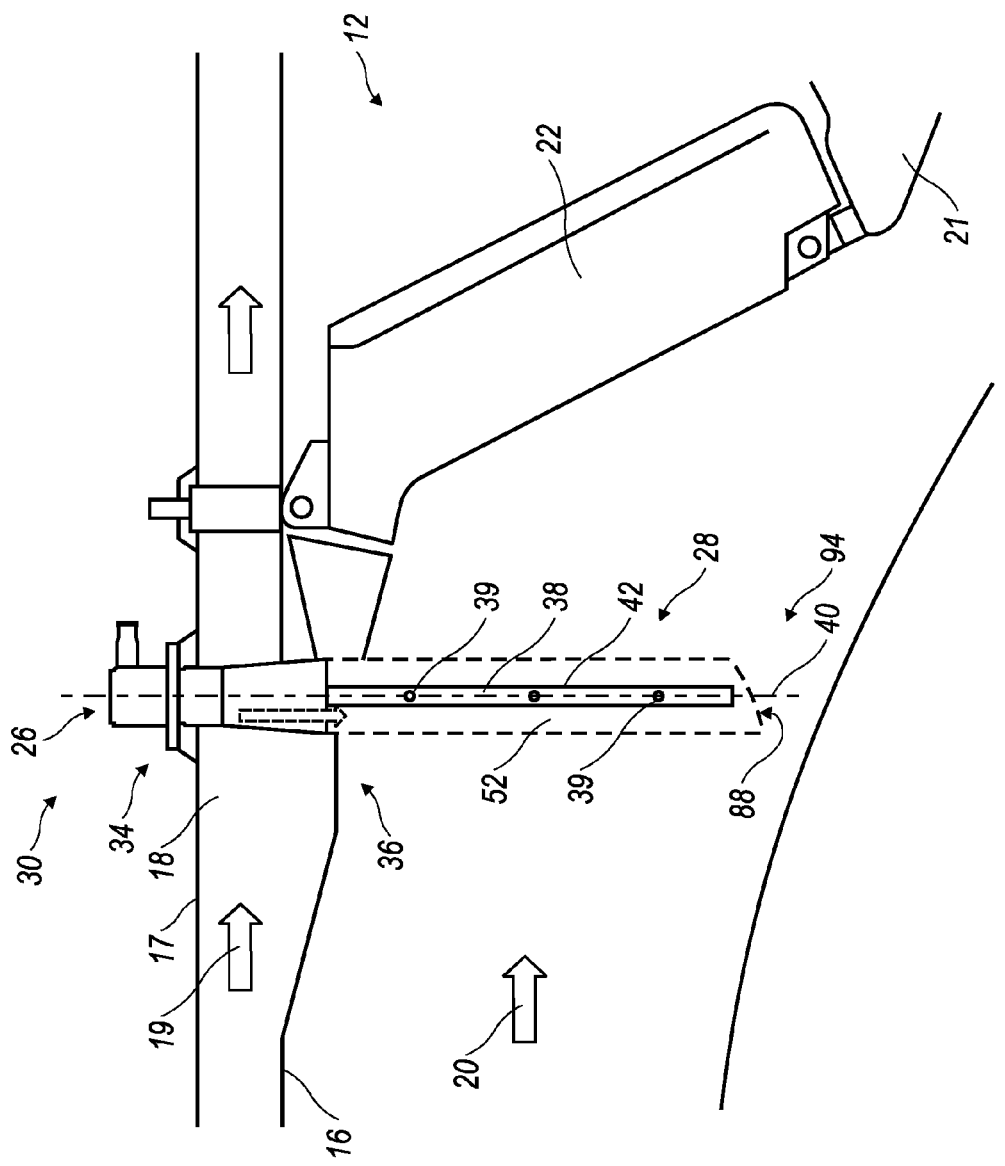
FIG. 3 is a schematic view, taken as a radial section, showing details of the installed configuration of one spraybar.

The radial section view of FIG. 3 schematically depicts the installed configuration 30 of a spraybar 28 in an engine 12. The spraybar 28, in this instance, constitutes an afterburner fuel-feed arrangement 26. The spraybar 28 includes a spray head 34, which in this illustration is connectable to a fuel source 35 (see FIG. 4). The location of the spray head 34 designates a head-end 36 of the spraybar 28. In FIG. 3, an elongate fuel pipe 38, preferably cylindrical shaped, is depicted. As can be best appreciated from FIG. 7, the visible fuel pipe 38 in FIG. 3 is a front pipe (from the perspective of the drawing) of a pair 46 of elongate fuel pipes housed within a shroud 50 and oriented crosswise to the core gas flow 20.

The fuel pipe 38 includes fuel outlets 39, exemplarily shown in FIG. 3 to number three, through which fuel from the source 35 is spray-ejected. From FIG. 3, it may be appreciated that each fuel pipe 38 has a longitudinal axis 40 and an exterior surface 42. As will be discussed in greater detail herebelow, and is more clearly illustrated in FIGS. 7, 9 and 10, a portion of the exterior surface 42 of the fuel pipe 38 constitutes a shroud-engaging portion 44.

FIG. 3 also illustrates a preferred embodiment of the afterburner fuel-feed arrangement 26 wherein a spraybar 28 is mounted in the casing 16 of the engine 12, independently from the flame holding arrangement. In the illustration, the flame holding arrangement is schematically depicted as comprising a flame holder 21 supported upon struts 22 which are fixed to the casing 16.

It should also be mentioned that FIG. 3 schematically illustrates an installed orientation, or configuration 30 of the spraybar 28 in which a cooling air outlet 88 is located at the distal end thereof, and oriented to form a negative air-scoop 94. This negative air-scoop 94 can be considered to be akin to conventional air-scoops employed, for example, as air rams on airplanes. The "negative" aspect is achieved by effectively twisting the scoop one-hundred and eighty degrees with respect to oncoming-flow, which in the instance of the present invention, is the core gas flow 20. Therefore, the cooling air outlet 88 faces predominantly away from the oncoming core gas flow 20 so that a low-pressure zone or region is developed about the open area 90 of the outlet 88 so that cooling air is effectively withdrawn therefrom, without the possibility of backpressure. Still further, the aerodynamic characteristics of the elliptically shaped shroud assure very little wake-effect, downstream therefrom.

Figure 5:
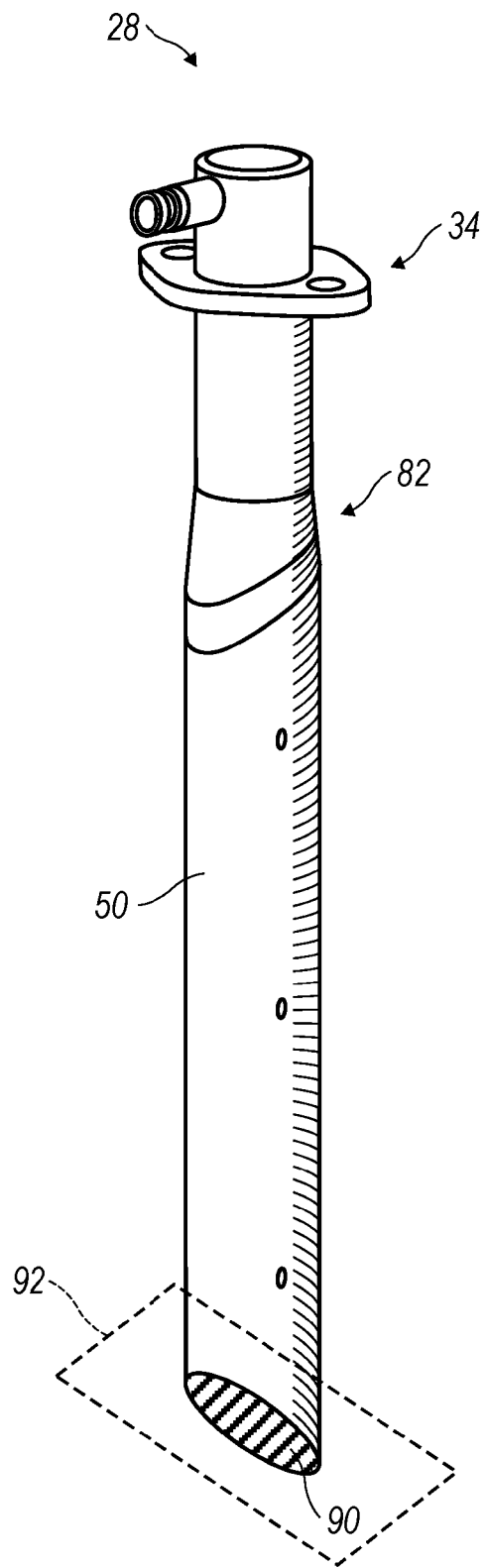
FIG. 5 is a detailed perspective of the elongate fuel spraybar of FIG. 4, but taken from the opposite direction, and illustrating details of the negative air-scoop cooling air outlet of the spraybar.

The open area 90 of the air outlet 88 is illustrated in FIG. 5, where a reference plane 92 which contains (is coincident with) the open area 90 is provided for establishing relative orientations and configurations of outlet 88 with respect to the balance of the spraybar 28.

Figure 4:
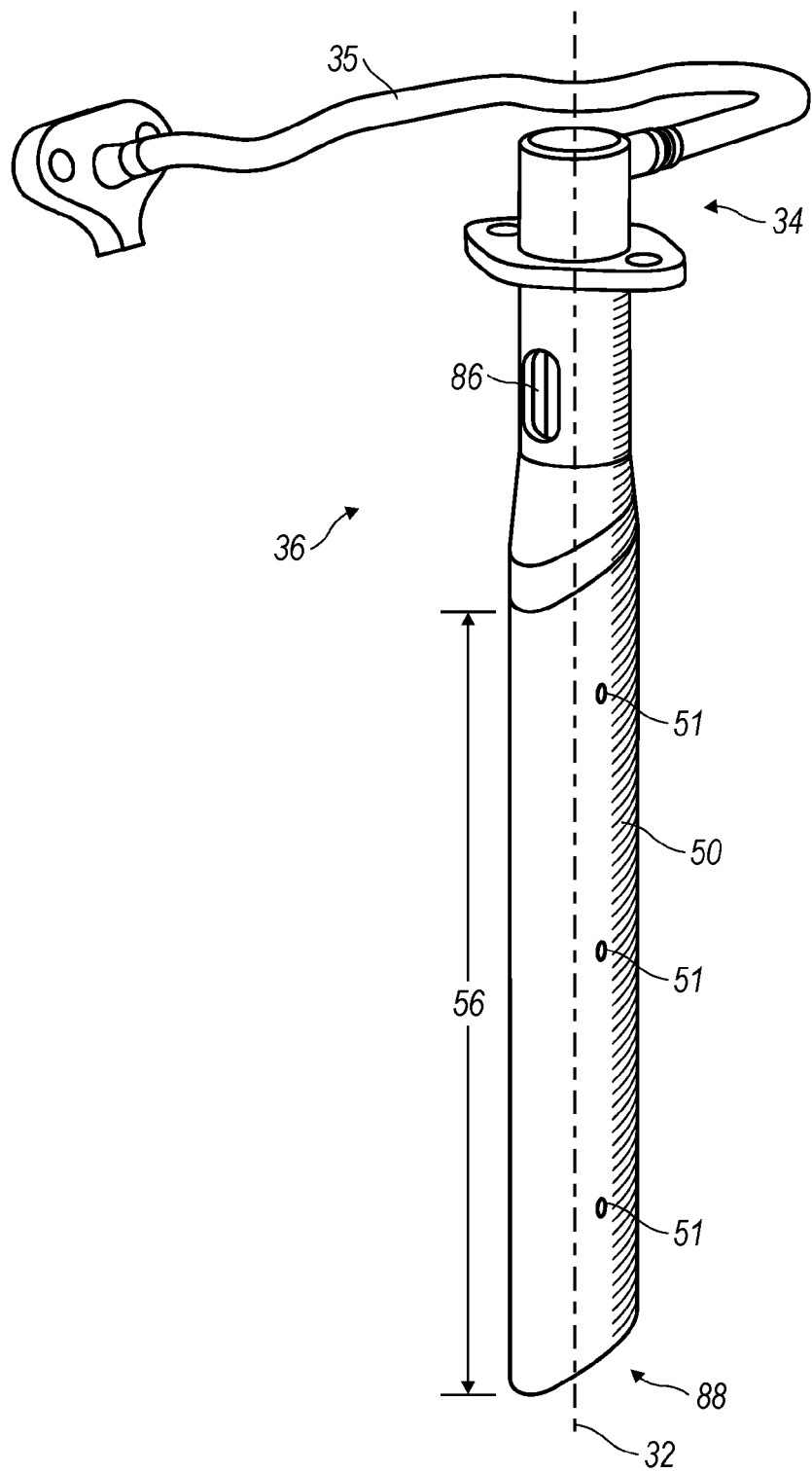
FIG. 4 is a detailed perspective view of an elongate fuel spraybar shown in fluid communication with a fuel source.

As intimated hereinabove, FIG. 4 provides a perspective view of the embodiment of the present invention in which the afterburner fuel-feed arrangement 26 is constituted exclusively by the elongate spraybar 28, which in this illustrated embodiment is shown fluidly connected with a fuel source 35 (which is not necessarily a required component of the instantly described embodiment of the invention). Here, however, exemplary placement of a cooling air inlet 86 into the spraybar 28 is shown proximate the spray head 34, and the elliptical, elongate nature of the shroud 50 is illustrated. Still further, the longitudinal axis 32 of the spraybar 28 is shown, as is the length 56 of the shroud 50. Fuel outlets 51 through the shroud 50 are also shown, and should be understood to align with fuel outlets 39 of at least one of the fuel pipes 38 in the assembled configuration of the afterburner arrangement 26.

Figure 6:
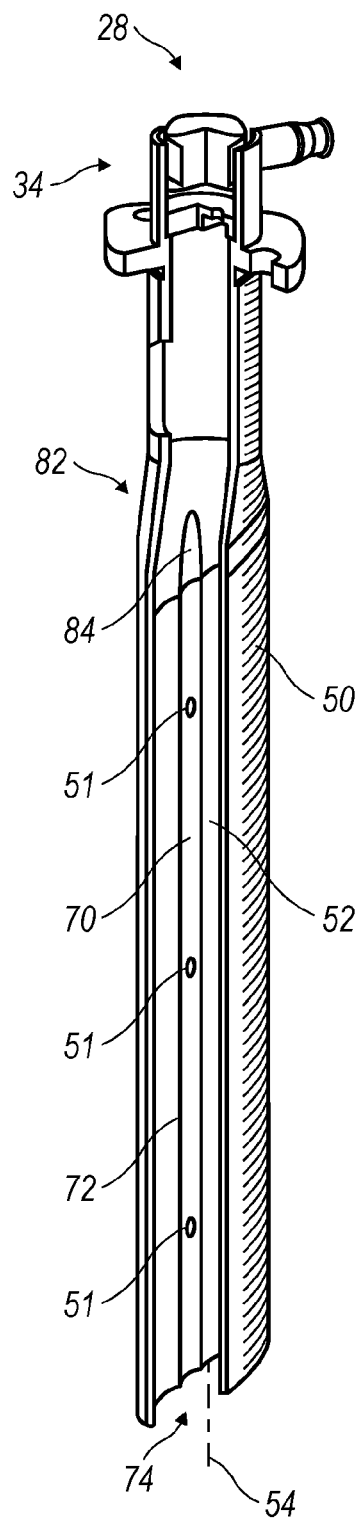
FIG. 6 is a partial-cutaway perspective view of the spraybar illustrating an exemplary embodiment of the pipe receiving portion of the shroud.
Figure 7:
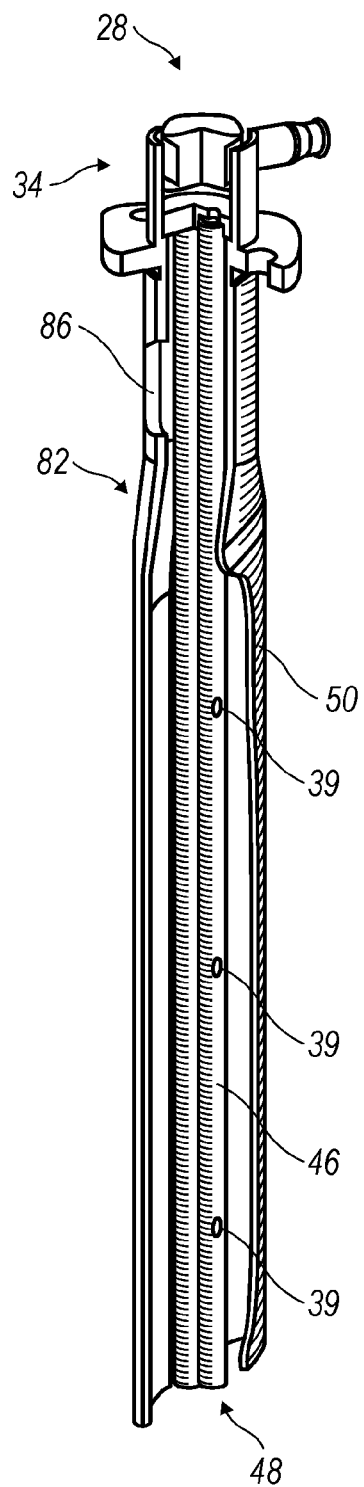
FIG. 7 is a partial-cutaway, perspective view similar to FIG. 6, but showing a pair of elongate fuel pipes installed within the shroud.
Figure 8:
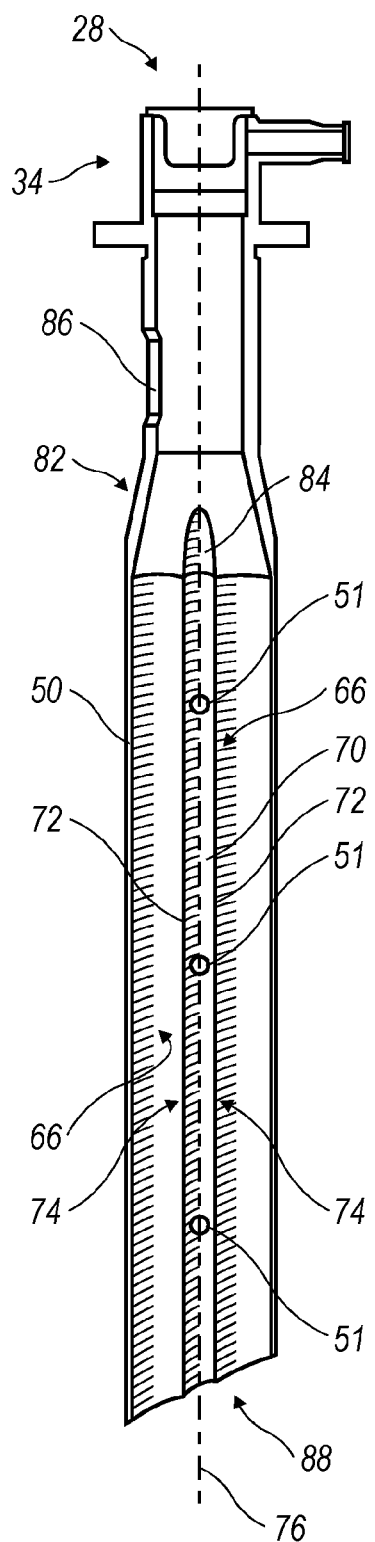
FIG. 8 is a cutaway perspective view illustrating an interior half of a spraybar, and more particularly showing interior details of the shroud.

FIGS. 6-8 provide various cutaway views of the spraybar 28. FIG. 6 illustrates the spraybar 28 without fuel pipes 38 installed therein, and as well indicates the longitudinal axis 54 of the shroud 50. The interior space 52 of the shroud 50 can be best appreciated from the cross-section of FIG. 9.

The spray head 34 is generally cylindrically shaped, while the shroud 50 is generally elliptically shaped. Therefore, an expanding transition portion 82 is interconnectively interposed therebetween. A groove or recess 84 is shown in an interior surface of the transition portion 82 which serves as a lead-in to an elongate recessed portion 70 of the pipe receiving portion 68 of the shroud 50. Details of the interior lateral sidewall 66 of the shroud 50 are clearly depicted in FIGS. 8 and 9. Therein, a "wave" or fluted configuration of the lateral sidewall 66 is shown as being collectively constituted by the elongate, concave, groove or recessed portion 70 that is flanked on each lateral side thereof by an elongate raised-ridge portion 72.

Particularly suitable methods for manufacturing the shroud 50 include cold-drawing a tube through a slotted mold or die having a shape corresponding to the desired cross-sectional shape of the shroud, including the "wave" or fluted configuration of the pipe-receiving portions 68 located on the shroud's lateral sidewall 66. Benefits of such manufacture includes the production of a relatively rigid shroud having high thermal strength. As an alternative, it is also contemplated that the shroud 50 may be produced by extrusion methods.

Figure 9:
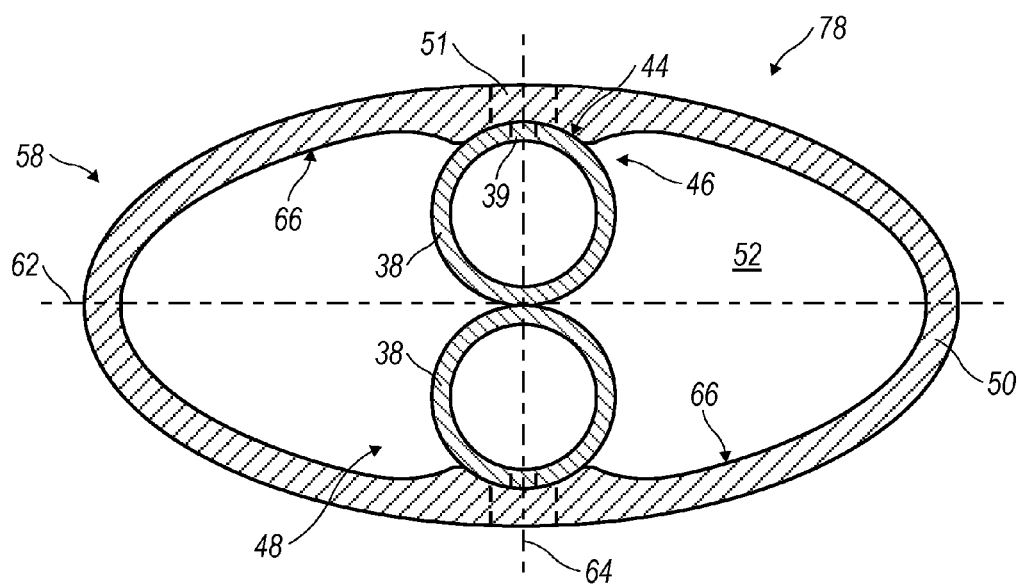
FIG. 9 is a cross-sectional view of a spraybar illustrating an inactive fuel-feed state (configuration) in which no fuel is being fed through the fuel pipes.
Figure 10:
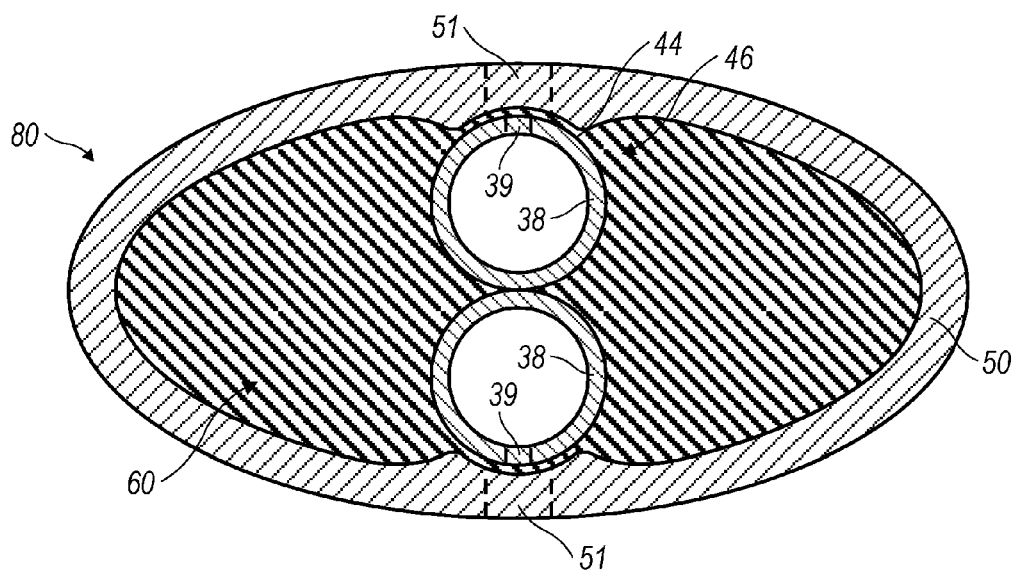
FIG. 10 is a cross-sectional view of the spraybar as illustrated in FIG. 9, but in an active, feel-feeding state in which the fuel pipes have been cooled relative to the configuration of FIG. 9.

It will be appreciated by those persons skilled in the art, especially when taken together with the illustrations of FIGS. 9 and 10, that the wave-configuration of the pipe receiving portion 68 acts and serves as a brace 74 to the shroud 50. The bracing action of this configuration resists bending moments in the shroud 50, and consequently the spraybar 28, in directions substantially perpendicular to the longitudinal axis 76 of symmetry of the pipe receiving portion 68.

FIG. 7 is also a cutaway view of the spraybar 28, but with a pair 46 of elongate fuel pipes 38 installed within the shroud 50. From this Figure, especially when taken together with FIG. 9, it can be appreciated that the pair 46 of elongate fuel pipes serve as a brace to the spraybar 28 against bending moments, particularly those directed across the paired fuel pipes 38 (aligned with the short axis 64).

FIGS. 9 and 10 illustrate cross-sectional views of the elongate spraybar 28, taken along the length 56 of the shroud 50. In each, the elliptically tubular cross-sectional shape 58 of the shroud 50, and consequently a predominance of the spraybar 28 is shown. An interior cross-sectional area 60 of the shroud 50 is depicted in FIG. 10. Furthermore, the elliptical shape also defines long cross-axis 62 and short cross-axis 64. Still further, the alignment of fuel outlets 39, 51 can be appreciated from these figures.

FIG. 9 illustrates an inactive state of the afterburner fuel-feed arrangement 26. In this configuration, no afterburner fuel is being fed through the fuel pipes 38. In contrast, FIG. 10 illustrates an active state in which fuel is being fed through the fuel pipes 38. By comparison, the fuel pipes 38 are relatively cooler in the active state and experience a certain degree of radial contraction. In the inactive state of FIG. 9, a tight friction fit 78 is established between the fuel pipes 38 and shroud 50 at the engaging portion 44. Conversely, in the active state of FIG. 10, due to the constriction of the cooled fuel pipes 38, a reduced friction fit 80 is established with the shroud 50. It is contemplated that the abutting fit between the pipes 38 and shroud 50 may be merely reduced in the active state, or as depicted in FIG. 10, a gap air space may be created therebetween. In either event, the location of the fuel pipes 38 relative to the shroud 50 is maintained by the raised-ridge portions 72 of the pipe receiving portion 68 formed on the interior of the shroud 50.

Figure 11:
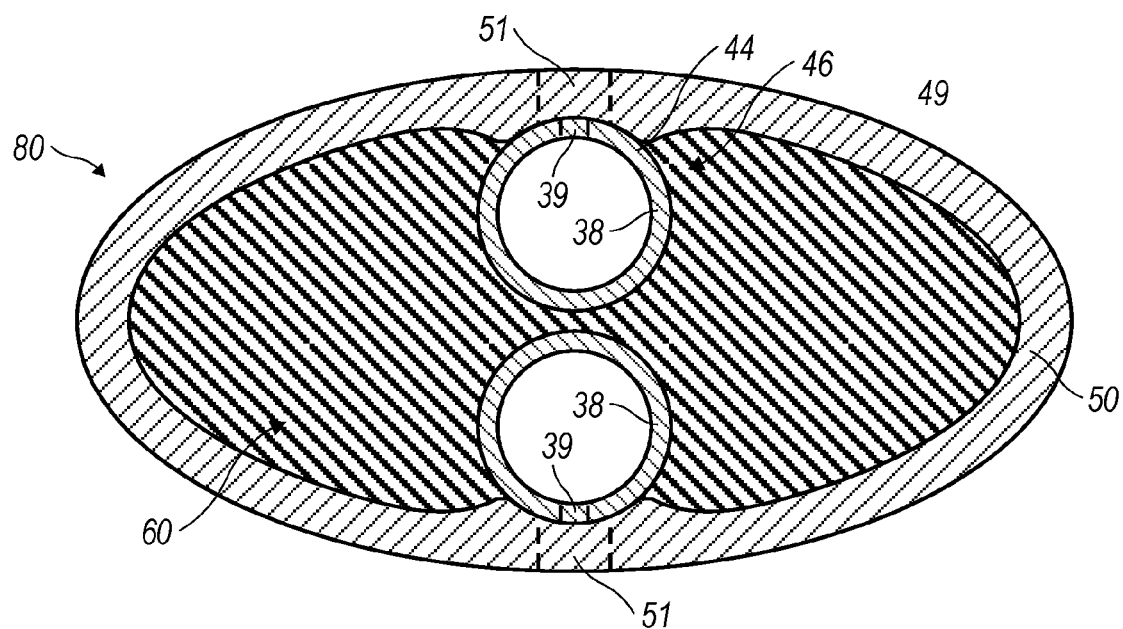
FIG. 11 is a cross-sectional view of the spraybar taken at a top location or portion of the embodiment depicted in FIGS. 14 and 15 below the spray head and where the fuel pipes are spaced apart, one from the other.
Figure 12:
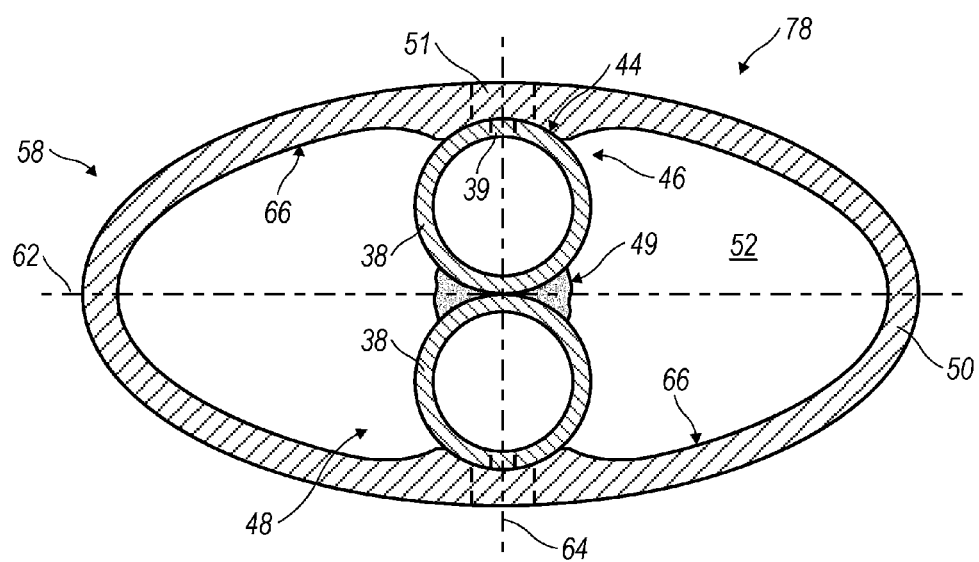
FIG. 12 is a cross-sectional view of the spraybar taken at a lower location or portion of the embodiment depicted in FIGS. 14 and 15 showing the paired fuel pipes welded together and in an inactive state.
Figure 13:
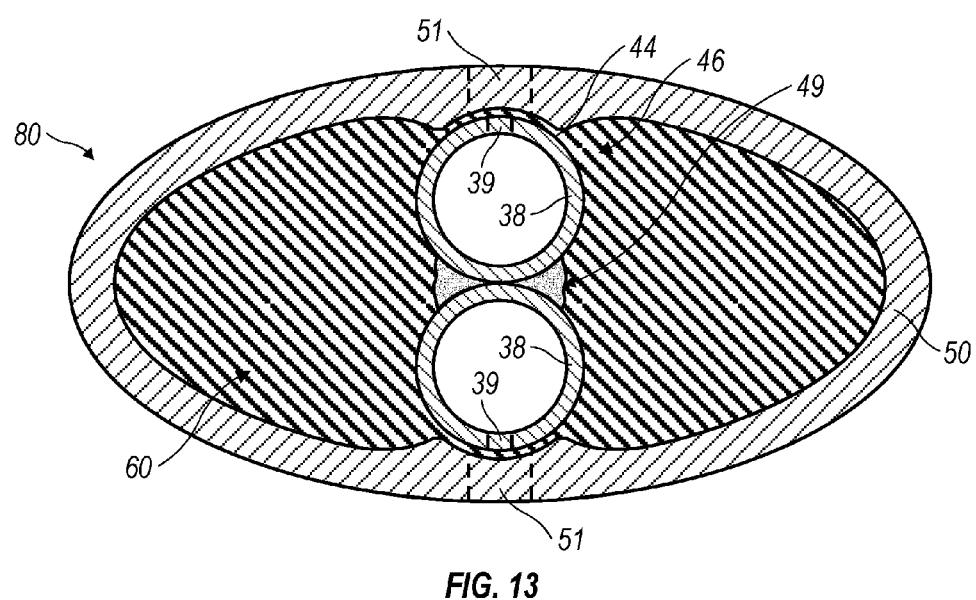
FIG. 13 corresponds to FIG. 12, but in an active state.
Figure 14:
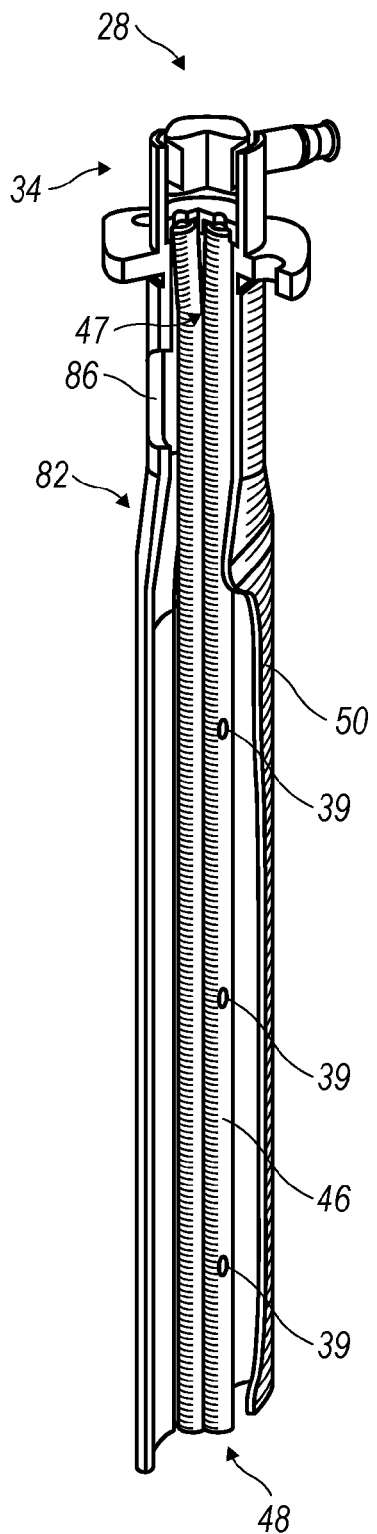
FIG. 14 is a perspective, cutaway view of an exemplary embodiment of the spraybar in which the paired fuel pipes are welded together along a majority of their length.
Figure 15:
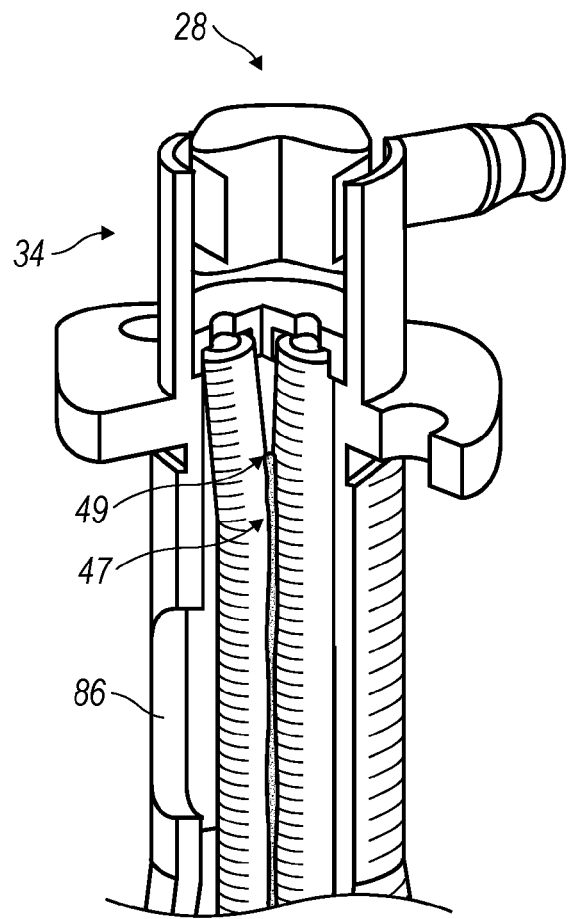
FIG. 15 is a detailed cutaway, perspective view showing details of the paired fuel pipes adjacent the spray head of the spraybar.

One particularly preferred and exemplary embodiment of the elongate fuel spraybar 28 is illustrated in FIGS. 11-15. FIG. 14 provides a cut-away perspective view of the entire length of the spraybar 28, with the interior thereof exposed to reveal a pair of associated fuel pipes 38. A detailed cut-away, perspective view of the spray head 34 is provided in FIG. 15 where the manifold for the distribution of fuel to each pipe 38 is shown. As depicted, at the spray head 34, the two fuel pipes 38 are separated from one another, but converge toward each other at a top portion 47 thereof into an adjacent and parallel orientation. As illustrated, the adjacent portions of the fuel pipes 38 are joined together by a braze-weld connection 49 along a majority of their extension length. A cross-section depicting the fuel pipes 38 in their separated configuration adjacent the spray head 34 is illustrated in FIG. 11. An example of the two pipes' orientation along their welded-together length is depicted in FIG. 12 regarding an inactive state in which fuel is not flowing through the pipes 38 and therefore abutting engagement exist between those pipes 38 and the shroud 50. FIG. 13 is a cross-sectional view illustrating an active state of the spraybar 28 taken at a similar location to that shown in FIG. 12 except the welded together pipes 38 are slightly separated from the shroud 50.

As intimated above, the described embodiments of the present invention are disclosed for illustration purposes of exemplary implementations of the unique afterburner fuel-feed arrangement 26. It should be appreciated, however, that these examples are in no way limiting with respect to the afforded patent protection which is defined by the following patented claims.

What is claimed is:

1. An elongate, elliptically-shaped shroud for an afterburner fuel-feed arrangement, the elliptical shape of the shroud defining major and minor axes, said shroud being configured to surround at least one elongate fuel pipe and having interior lateral sidewalls spaced apart from each other along the minor axis of the ellipse and at least one of said interior lateral sidewalls including a pipe-receiving portion having a groove formed therein and configured to abuttingly engage a corresponding shroud-engaging portion of an exterior surface of an engaged elongate fuel pipe, said pipe-receiving portion being configured to maintain the position of an engaged elongate fuel pipe relative to said shroud;

wherein the shroud has sufficient thermal strength to withstand the operating temperature within the afterburner section of a jet engine; and wherein said pipe-receiving portion comprises two parallel elongate raised-ridge portions which define said groove between them and which are mutually configured to accommodate said fuel pipe therebetween.

2. The elongate, aerodynamic-shaped shroud as recited in claim 1, wherein said pipe-receiving portion is elongate in a longitudinal direction of said shroud.

3. The elongate, aerodynamic-shaped shroud as recited in claim 1, wherein said pipe-receiving portion is elongate and continuous in a longitudinal direction of said shroud.

4. An afterburner fuel-feed arrangement comprising:
an elongate fuel spraybar for distributing fuel to the afterburner section of a turbo-combustion engine, said spraybar having a longitudinal axis and including a plurality of elongate fuel pipes and an elongate, aerodynamic, elliptically-shaped shroud surrounding said fuel pipes, said spraybar configured to be mounted in a casing of a turbo-combustion engine and thereby project said surrounded fuel pipes into an interior through-core of the engine in laterally side-by-side, cross-wise orientation to a core gas flow thereof for establishing an installed configuration of said spraybar; and
a pair of said plurality of fuel pipes being arranged adjacent and substantially parallel to one another in said shroud and said pair of fuel pipes being oriented laterally side-by-side, crosswise to the core gas flow;
wherein each fuel pipe of said pair of fuel pipes has at least one outlet directed towards the adjacent lateral sidewall of said shroud, and said shroud has at least one fuel outlet aligned with said fuel pipe outlet.

5. An afterburner fuel-feed arrangement comprising:
an elongate fuel spraybar for distributing fuel to the afterburner section of a turbo-combustion engine, said spraybar having a longitudinal axis and including a plurality of elongate fuel pipes and an elongate, aerodynamic, elliptically-shaped shroud surrounding said fuel pipes, said spraybar configured to be mounted in a casing of a turbo-combustion engine and thereby project said surrounded fuel pipes into an interior through-core of the engine in laterally side-by-side, cross-wise orientation to a core gas flow thereof for establishing an installed configuration of said spraybar; and
a pair of said plurality of fuel pipes being arranged adjacent and substantially parallel to one another in said shroud and said pair of fuel pipes being oriented laterally side-by-side, crosswise to the core gas flow;
wherein said pair of fuel pipes are interconnected with one another along a majority of a length of each respective fuel pipe.

6. The afterburner fuel-feed arrangement as recited in claim 5, wherein said pair of interconnected fuel pipes are adapted to move in unison, one with the other, in a radial direction of the turbo-combustion engine when operating thereupon.

7. An afterburner fuel-feed arrangement comprising:
an elongate fuel spraybar for distributing fuel to the afterburner section of a turbo-combustion engine, said spraybar having a longitudinal axis and including a fuel-receiving spray head in fluid communication with a plurality of elongate fuel pipes surrounded by an elongate, aerodynamic-shaped shroud, said spray head configured to be mounted in a casing of a turbo-combustion engine and thereby project said surrounded fuel pipes into an interior through-core of the engine in laterally side-by-side, cross-wise orientation to a core gas flow thereof for establishing an installed configuration of said spraybar; and
said shroud having an interior lateral sidewall including a pipe-receiving portion with a groove formed therein, said pipe-receiving portion configured to abuttingly engage a corresponding shroud-engaging portion of an exterior surface of one of said plurality of elongate fuel pipes, the groove serving to maintain the position of a fuel pipe received therein relative to said shroud;
said shroud having an elliptically tubular cross-sectional shape, taken perpendicularly to the longitudinal axis of said spraybar, along a predominance of a length of said shroud; and
said elliptical cross-sectional shape defining a long and short cross-axis of said shroud, and at least two of said plurality of elongate fuel pipes being arranged adjacent and substantially parallel to one another, and with a longitudinal axis of each of said at least two elongate fuel pipes perpendicularly intersecting said short cross-axis of said shroud;
said at least two elongate fuel pipes being adjacently abuttingly arranged and in abutting contact with opposite interior lateral sidewalls of said shroud, said at least two elongate fuel pipes thereby constituting a brace in said shroud against bending moments about the long cross-axis of said shroud.

8. The afterburner fuel-feed arrangement as recited in claim 7, further comprising:
said spraybar having eigenfrequencies greater than eigenfrequencies of receiving engines of said spraybar.

9. An afterburner fuel-feed arrangement comprising:
an elongate fuel spraybar for distributing fuel to the afterburner section of a turbo-combustion engine, said spraybar having a longitudinal axis and including a fuel-receiving spray head in fluid communication with a plurality of elongate fuel pipes surrounded by an elongate, aerodynamic-shaped shroud, said spray head configured to be mounted in a casing of a turbo-combustion engine and thereby project said surrounded fuel pipes into an interior through-core of the engine in laterally side-by-side, cross-wise orientation to a core gas flow thereof for establishing an installed configuration of said spraybar; and
said shroud having an interior lateral sidewall including a pipe-receiving portion with a groove formed therein, said pipe-receiving portion configured to abuttingly engage a corresponding shroud-engaging portion of an exterior surface of one of said plurality of elongate fuel pipes, the groove serving to maintain the position of a fuel pipe received therein relative to said shroud;
wherein said shroud further comprises a plurality of pipe-receiving portions, each of which includes an elongate recessed portion flanked on each of two lateral sides thereof by an elongate raised-ridge portion.

10. The afterburner fuel-feed arrangement as recited in claim 9, further comprising:
a tight friction-fit existing between each of said plurality of pipe-receiving portions and a respective fuel pipe received therein when said spraybar is in an inactive state without fuel being fed through said fuel pipes, and a comparatively reduced friction-fit existing between each of said plurality of pipe-receiving portions and the respective fuel pipe received therein when said spraybar is in an active state with fuel being fed through said fuel pipes.

11. The afterburner fuel-feed arrangement as recited in claim 10, further comprising:
each of said fuel pipes being cylindrically shaped and each respective pipe-receiving portion being concavely configured and sized to establish an abutting conformance fit with a cylindrical fuel pipe received therein in the inactive state.

12. The afterburner fuel-feed arrangement as recited in claim 10, further comprising:
each of said fuel pipes being cylindrically shaped and each respective pipe-receiving portion being concavely configured and sized to establish a spaced-apart, but trapped configuration with a cylindrical fuel pipe received therein in the active state.

13. The afterburner fuel-feed arrangement as recited in claim 9, further comprising:

each of said plurality of pipe-receiving portions having a longitudinal axis of symmetry oriented substantially parallel to the longitudinal axis of said spraybar.

14. The afterburner fuel-feed arrangement as recited in claim 9, wherein said elongate raised ridges of said pipe-receiving portions constitute braces on said interior lateral sidewalls of said shroud against bending moments about the long cross-axis of said shroud.

15. The afterburner fuel-feed arrangement as recited in claim 9, further comprising:

an expanding transition portion interposed between said spray head and said shroud, and an interior wall of said expanding transition portion being provided with a plurality of recesses therein, each of said recesses being aligned with an elongate recessed portion of a respective pipe-receiving portion of said shroud.

* * * * *